United States Patent
Jha et al.

(10) Patent No.: US 10,001,229 B2
(45) Date of Patent: Jun. 19, 2018

(54) FLEXIBLE PIPE BODY AND METHOD OF MANUFACTURE

(71) Applicant: GE OIL & GAS UK LIMITED, Bristol (GB)

(72) Inventors: Vineet Kumar Jha, Newcastle upon Tyne (GB); Neville Dodds, Newcastle upon Tyne (GB); James Robert Latto, Newcastle upon Tyne (GB)

(73) Assignee: GE Oil & Gas UK Limited, Bristol (GB)

( * ) Notice: Subject to any disclaimer, the term of this patent is extended or adjusted under 35 U.S.C. 154(b) by 0 days. days.

(21) Appl. No.: 14/783,986

(22) PCT Filed: Feb. 21, 2014

(86) PCT No.: PCT/GB2014/050515
§ 371 (c)(1),
(2) Date: Oct. 12, 2015

(87) PCT Pub. No.: WO2014/167280
PCT Pub. Date: Oct. 16, 2014

(65) Prior Publication Data
US 2016/0069484 A1 Mar. 10, 2016

(30) Foreign Application Priority Data

Apr. 12, 2013 (GB) .................................. 1306667.5
Nov. 19, 2013 (GB) .................................. 1320444.1

(51) Int. Cl.
*F16L 11/12* (2006.01)
*B29C 53/58* (2006.01)
(Continued)

(52) U.S. Cl.
CPC .............. *F16L 11/12* (2013.01); *B29C 35/02* (2013.01); *B29C 53/582* (2013.01); *B29C 65/72* (2013.01);
(Continued)

(58) Field of Classification Search
None
See application file for complete search history.

(56) References Cited

U.S. PATENT DOCUMENTS 3,378,426 A 4/1968 Medney
5,771,673 A 6/1998 Lorch
(Continued)

FOREIGN PATENT DOCUMENTS

CN 101334122 A 12/2008
GB 1273454 5/1972
(Continued)

OTHER PUBLICATIONS

International Search Report and Written Opinion for corresponding PCT/GB2014/050515, dated May 8, 2014.
(Continued)

*Primary Examiner* — Craig Schneider
*Assistant Examiner* — David Deal
(74) *Attorney, Agent, or Firm* — Reza Mollaaghababa; Thomas Engellenner; Pepper Hamilton LLP

(57) ABSTRACT

A flexible pipe body and method of producing a flexible pipe body are disclosed. The method includes providing two or more non-bonded composite filaments (302) as a non-bonded filament bundle (310); applying a braid element (304) around the filament bundle (310) to thereby form a braided bundle (310) comprising non-bonded filaments (302); and helically wrapping the braided bundle (310) around a flexible pipe body layer (502).

26 Claims, 8 Drawing Sheets

(51) Int. Cl.

| | | |
|---|---|---|
| *F16L 11/08* | (2006.01) | |
| *B32B 27/12* | (2006.01) | |
| *B32B 1/08* | (2006.01) | |
| *B29C 35/02* | (2006.01) | |
| *B29C 65/72* | (2006.01) | |
| *B29C 65/78* | (2006.01) | |
| *B29C 65/00* | (2006.01) | |
| *F16L 1/14* | (2006.01) | |
| *F16L 11/02* | (2006.01) | |
| *F16L 11/10* | (2006.01) | |
| *F16L 57/02* | (2006.01) | |
| *B29C 70/86* | (2006.01) | |
| *B29L 23/00* | (2006.01) | |
| *B29K 63/00* | (2006.01) | |
| *B29K 105/08* | (2006.01) | |
| *B29K 307/04* | (2006.01) | |
| *B29K 105/10* | (2006.01) | |

(52) U.S. Cl.
CPC .......... *B29C 65/7858* (2013.01); *B29C 66/69* (2013.01); *B29C 70/86* (2013.01); *B32B 1/08* (2013.01); *B32B 27/12* (2013.01); *F16L 1/14* (2013.01); *F16L 11/02* (2013.01); *F16L 11/083* (2013.01); *F16L 11/10* (2013.01); *F16L 57/02* (2013.01); *B29K 2063/00* (2013.01); *B29K 2105/0872* (2013.01); *B29K 2105/0881* (2013.01); *B29K 2105/10* (2013.01); *B29K 2307/04* (2013.01); *B29L 2023/005* (2013.01); *B29L 2023/22* (2013.01); *B32B 2260/023* (2013.01); *B32B 2260/046* (2013.01); *B32B 2262/0223* (2013.01); *B32B 2262/0253* (2013.01); *B32B 2262/0261* (2013.01); *B32B 2262/0276* (2013.01); *B32B 2262/101* (2013.01); *B32B 2262/103* (2013.01); *B32B 2262/106* (2013.01); *B32B 2307/54* (2013.01); *B32B 2307/554* (2013.01); *B32B 2307/584* (2013.01); *B32B 2307/714* (2013.01); *B32B 2597/00* (2013.01)

(56) References Cited

U.S. PATENT DOCUMENTS

| | | | |
|---|---|---|---|
| 6,390,141 B1 * | 5/2002 | Fisher | F16L 11/081 138/125 |
| 6,491,779 B1 * | 12/2002 | Bryant | F16L 11/081 156/169 |
| 6,620,475 B1 | 9/2003 | Reynolds | |
| 7,114,751 B2 * | 10/2006 | Reynolds, Jr. | B29C 33/505 138/97 |
| 7,264,021 B1 * | 9/2007 | Daikai | B29C 57/04 138/123 |
| 2009/0205733 A1 | 8/2009 | Stringfellow et al. | |

FOREIGN PATENT DOCUMENTS

| | | |
|---|---|---|
| JP | S488867 B1 | 3/1973 |
| WO | 2001/33129 A1 | 5/2001 |
| WO | 2012131315 A1 | 10/2012 |
| WO | WO 2012131315 A1 * | 10/2012 ........... B29C 53/582 |

OTHER PUBLICATIONS

Chinese Office Action from corresponding Chinese Patent Application No. 201480021059.7, dated Nov. 1, 2016; 21 pages.

* cited by examiner

FLEXIBLE PIPE BODY AND METHOD OF MANUFACTURE

The present invention relates to a flexible pipe body and a method of manufacture of a flexible pipe body. In particular, but not exclusively, the present invention relates to the use of composite materials in an armour layer of a flexible pipe body, and a method of arranging and curing filaments of composite material to form the armour layer.

Traditionally flexible pipe is utilised to transport production fluids, such as oil and/or gas and/or water, from one location to another. Flexible pipe is particularly useful in connecting a sub-sea location (which may be deep underwater, say 1000 metres or more) to a sea level location. The pipe may have an internal diameter of typically up to around 0.6 metres (e.g. diameters may range from 0.05 m up to 0.6 m). Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including polymer, and/or metallic, and/or composite layers. For example, a pipe body may include polymer and metal layers, or polymer and composite layers, or polymer, metal and composite layers.

In many known flexible pipe designs the pipe body includes one or more pressure armour layers. The primary load on such layers is formed from radial forces. Pressure armour layers often have a specific cross section profile to interlock so as to be able to maintain and absorb radial forces resulting from outer or inner pressure on the pipe. The cross sectional profile of the wound wires which thus prevent the pipe from collapsing or bursting as a result of pressure are sometimes called pressure-resistant profiles. When pressure armour layers are formed from helically wound wired forming hoop components, the radial forces from outer or inner pressure on the pipe cause the hoop components to expand or contract, putting a tensile load on the wires.

In many known flexible pipe designs the pipe body includes one or more tensile armour layers. The primary loading on such a layer is tension. In high pressure applications, such as in deep and ultra deep water environments, the tensile armour layer experiences high tension loads from a combination of the internal pressure end cap load and the self-supported weight of the flexible pipe. This can cause failure in the flexible pipe since such conditions are experienced over prolonged periods of time.

Unbonded flexible pipe has been used for deep water (less than 3,300 feet (1,005.84 metres)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from the pressure armour and tensile armour layers of the flexible pipe body is increased.

Flexible pipe may also be used for shallow water applications (for example less than around 500 meters depth) or even for shore (overland) applications.

One way to improve the load response and thus performance of armour layers is to manufacture the layers from thicker and stronger and thus more robust materials. For example for pressure armour layers in which the layers are often formed from wound wires with adjacent windings in the layer interlocking, manufacturing the wires from thicker material results in the strength increasing appropriately. However as more material is used the weight of the flexible pipe increases. Ultimately the weight of the flexible pipe can become a limiting factor in using flexible pipe. Additionally manufacturing flexible pipe using thicker and thicker material increases material costs appreciably, which is also a disadvantage.

Metallic armour wires may add considerable weight to the flexible pipe body across the length of the pipe. Composite material may be used as an alternative to metal to provide sufficient strength to a pipe body without significantly increasing the weight.

One technique which has been used in the past to in some way alleviate the above-mentioned problem is the use of fibre-reinforced polymeric material (or composites) as structural elements in flexible pipes. Composites provide a high specific strength and stiffness and can enable reduced pipe weight (reducing top tension), and increase chemical resistance of the pipe compared to known metallic materials. The composite may be initially provided as a "pre-preg", i.e. pre-impregnated with fibres.

Thermoset composites employing high-strength, high-stiffness fibres are not ductile and cannot be plastically deformed like metals and have a limited ultimate strain in the order of 2% or less. Composite materials for making sections with reasonable dimensions therefore pose difficulties in the manufacturing process. A thermosetting material is defined as a material that cannot be re-melted after curing. A thermosetting material is the material in its uncured or partially cured state. A thermosetting composite that has been cured is herein defined as thermoset. A thermosetting composite may be formed into a tape and heated to cure the material. However, when the formed tape is wound to create a layer of a tubular pipe body, strain is introduced into the material, which affects performance. During winding onto a cylindrical base, a tape is bent in two planes, which can cause warping.

WO2012/131315 discloses a method of producing a flexible pipe body where a pre-preg composite material is fed under constant tension and wound helically over a fluid-retaining layer. Then the wound layer enters an oven where the pre-preg is cured.

U.S. Pat. No. 6,165,586 discloses a flat strip for reinforcing ducts including a layer of filamentary rovings. WO99/49259 discloses a composite carbon fibre armour for flexible pipe including carbon filament slivers.

It would be useful to provide an improvement or alternative method of forming a flexible pipe body.

According to a first aspect of the present invention there is provided a method of manufacturing a flexible pipe body comprising:
  providing two or more non-bonded composite filaments as a non-bonded filament bundle;
  applying a braid element around the filament bundle to thereby form a braided bundle comprising non-bonded filaments; and helically wrapping the braided bundle around a flexible pipe body layer.

According to a second aspect of the present invention there is provided a flexible pipe body for transporting fluids from a sub-sea location, comprising:

an inner layer; and an armour layer provided over the inner layer, wherein said armour layer is obtainable by the process of:
providing two or more non-bonded composite filaments as a non-bonded filament bundle;
applying a braid element around the filament bundle to thereby form a braided bundle comprising non-bonded filaments; and
helically wrapping the braided bundle around the inner layer.

Certain embodiments provide the advantage that a braided bundle including non-bonded filaments is more flexible compared to a solid pultruded section, allowing wrapping of the filaments and enabling the filaments to find their natural or preferred position with respect to each other and the object that they overlie.

Certain embodiments provide the advantage that the armour layer is formed substantially or completely free of residual strain, when the length of material is cured 'in situ', i.e. not formed into a new position after the curing stage.

Certain embodiments provide a flexible pipe formed with reduced weight and improved performance compared to pipes with standard armour layers. The composite material provides high strength at a controlled weight. Specific materials can be chosen for the required application. It will be appreciated however that the present invention will be particularly suitable for deep and ultra-deep water operation, where pressure on a pipe is higher due to the weight of the long pipe length, as well as the surrounding water itself, and a high strength per unit weight material is paramount.

Embodiments of the invention are further described hereinafter with reference to the accompanying drawings, in which.

In the drawings like reference numerals refer to like parts.

Figure 1A:
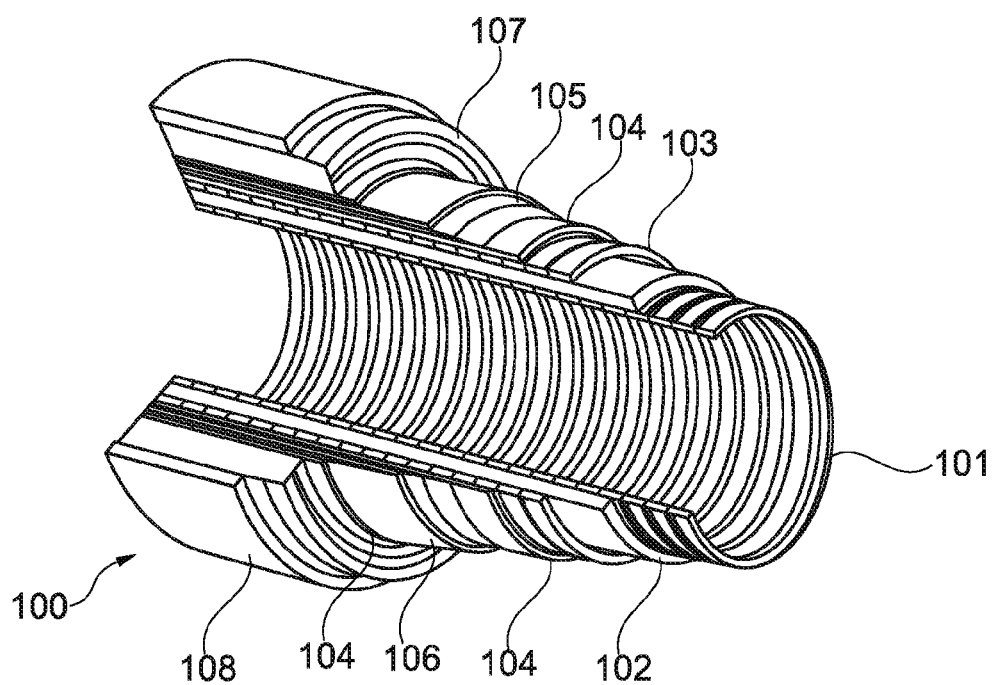
FIGS. 1a and 1b illustrate a flexible pipe body.

Throughout this description, reference will be made to a flexible pipe. It will be understood that a flexible pipe is an assembly of a portion of a pipe body and one or more end fittings in each of which a respective end of the pipe body is terminated. FIG. 1a illustrates how pipe body 100 may be formed from a combination of layered materials that form a pressure-containing conduit. Although a number of particular layers are illustrated in FIG. 1a, it is to be understood that the present invention is broadly applicable to coaxial pipe body structures including two or more layers manufactured from a variety of possible materials. For example, the pipe body may be formed from polymer layers, metallic layers, composite layers, or a combination of different materials. It is to be further noted that the layer thicknesses are shown for illustrative purposes only. As used herein, the term "composite" is used to broadly refer to a material that is formed from two or more different materials, for example a material formed from a matrix material and reinforcement fibres.

As illustrated in FIG. 1a, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. It will be appreciated that certain embodiments are applicable to 'smooth bore' operations (i.e. without a carcass) as well as such 'rough bore' applications (with a carcass).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer that increases the resistance of the flexible pipe to internal and external pressure and mechanical crushing loads. The layer also structurally supports the internal pressure sheath, and typically consists of an interlocked construction of wires with a lay angle close to 90°.

The flexible pipe body also includes an optional first tensile armour layer 105 and optional second tensile armour layer 106. Each tensile armour layer is used to sustain tensile loads and internal pressure. The tensile armour layer is often formed from a plurality of wires (to impart strength to the layer) that are located over an inner layer and are helically wound along the length of the pipe at a lay angle typically between about 10° to 55°. The tensile armour layers are often counter-wound in pairs. The tensile armour layers are often metallic layers, formed from carbon steel, for example. The tensile armour layers could also be formed from composite, polymer, or other material, or a combination of materials.

The flexible pipe body shown also includes optional layers of tape 104 which help contain underlying layers and to some extent prevent abrasion between adjacent layers. The tape layer may be a polymer or composite or a combination of materials.

The flexible pipe body also typically includes optional layers of insulation 107 and an outer sheath 108, which comprises a polymer layer used to protect the pipe against penetration of seawater and other external environments, corrosion, abrasion and mechanical damage.

Figure 1B:
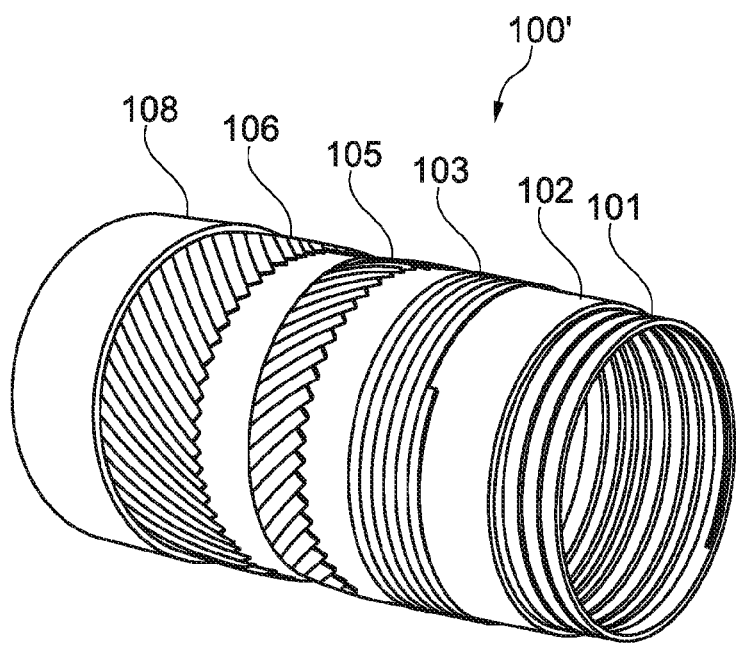

FIG. 1b shows another pipe body 100' illustrating a possible lay angle of tensile armour wires 105, 106.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example in FIG. 1a or 1b, are terminated in the end fitting in such a way as to transfer the load between the flexible pipe and the connector.

Figure 2:
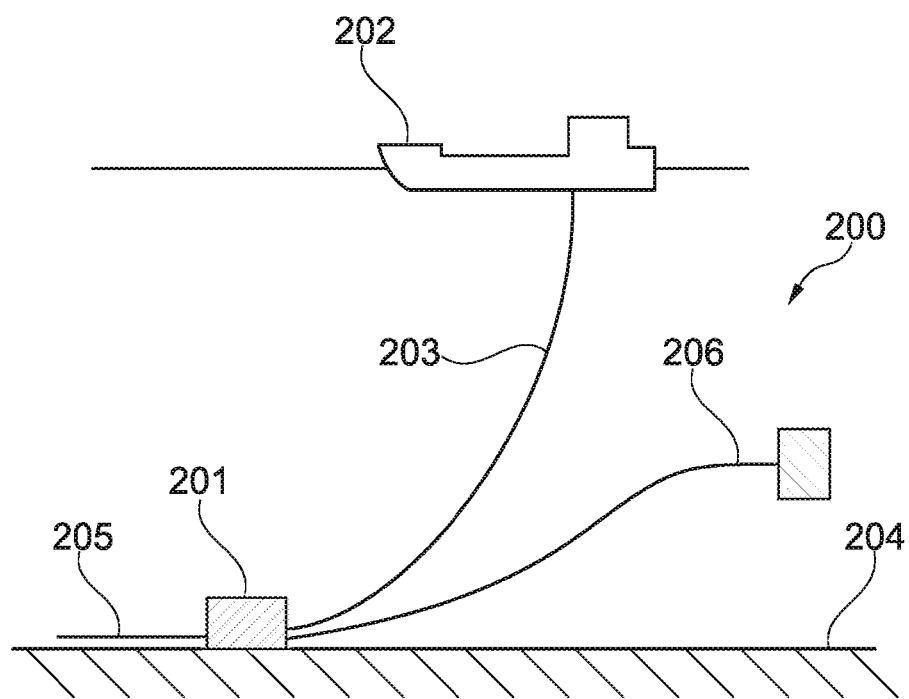
FIG. 2 illustrates a riser assembly.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be in segments of flexible pipe body with connecting end fittings.

It will be appreciated that there are different types of riser, as is well-known by those skilled in the art. Embodiments described herein may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 205 or jumper 206.

Figure 3:
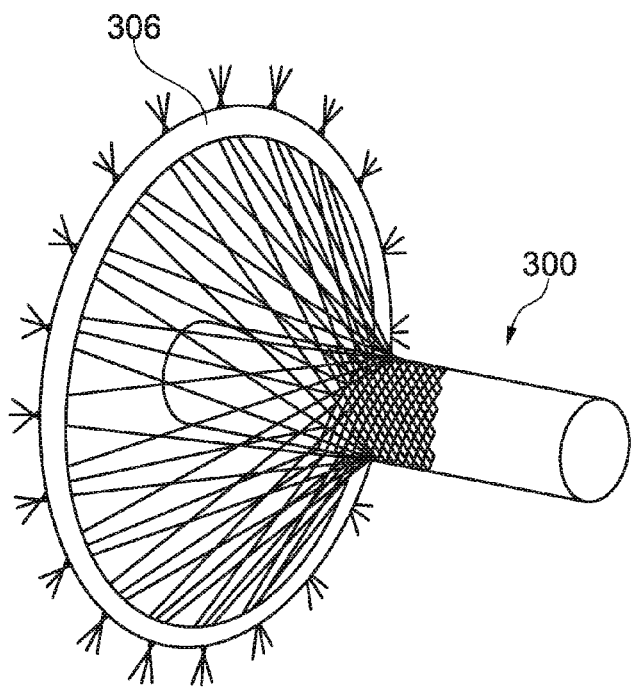
FIG. 3 illustrates a braiding machine.
Figure 4A:
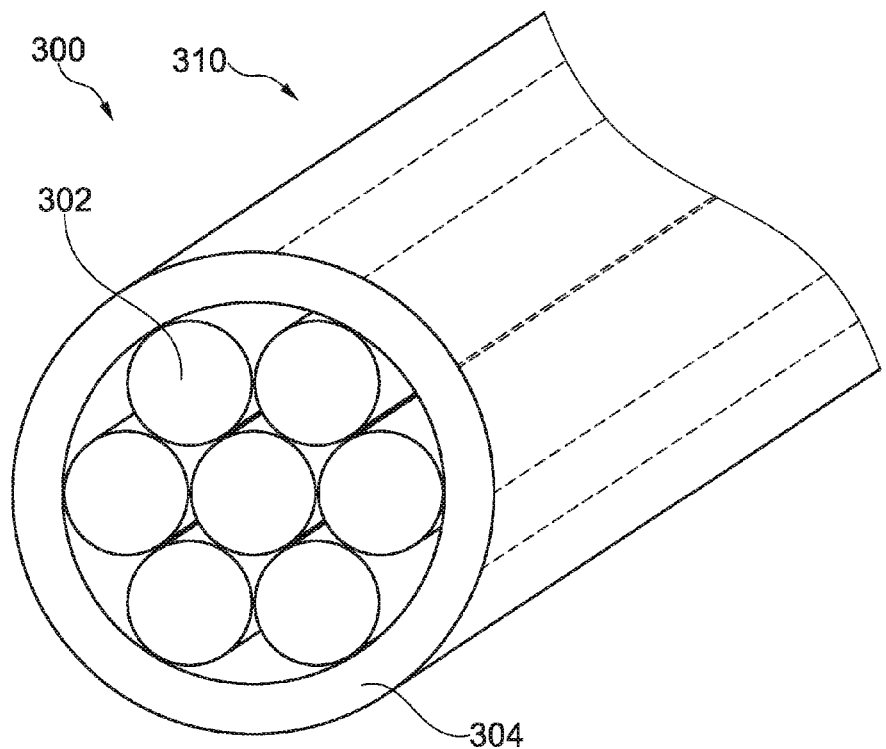
FIG. 4a illustrates a braided bundle for forming an armour layer.

FIGS. 3 and 4a illustrate a tensile armour wire 300 formed by a method of an exemplary embodiment. The armour wire 300 includes one or more composite filament 302. Here there are a plurality of filaments 302, though for the purposes of the description here, a single composite filament may be termed a filament bundle.

More specifically, a composite filament may be a length (fibre, rod, bar, prism, for example) of composite material and may include a unidirectional composite fibre (e.g. a composite matrix material plus reinforcing fibres). In this example the composite filament is an epoxy resin with unidirectional carbon fibres as reinforcing elements. The composite of matrix material and fibres can be obtained in pre-preg form from Zoltek Companies, Inc. This pre-preg is available in a partially cured state, with curing having been chemically retarded to enable easy handling, a continuous pre-preg material with even, minimal stress distribution over the material. The ratio of matrix to fibre (volume fraction of fibres) is around 50%. However, many thermosetting pre-preg materials may be suitable such as thermosetting, polyimides, bismaleimides, phenolics and modified epoxies. The reinforcing fibres could be any suitable fibre such as glass, ceramic, metal, polymeric fibres such as aramid, or mixtures thereof. The volume fraction of fibres could be any amount from around 40% to around 75%, aptly around 40% to 65%. The composite may further include other modifiers such as pigments or plasticizers. Aptly, most of the reinforcing fibres are orientated lengthways along the longitudinal axis of the tensile armour element. Some transverse or angled fibres may be included to help stabilize the structure. For example, more than 50%, or 60%, or 70%, or 80% or 90%, of the fibres can be aligned in a direction substantially axially with the length of material. Such orientation can help to stabilize the armour element during use. In other examples the composite filaments may include a thermoset material, e.g. epoxy, or uncured material e.g. a thermoplastic such as PVDF or PEEK, or elastomeric material such as butyl rubber, or a thermoplastic elastomer such as rubber modified polypropylene, or an alloy of such materials.

In this example the composite filaments are generally circular in cross section and have a diameter of about 1 mm. Of course other cross sectional shapes may be used, e.g. square, oval or other shape or a non-regular shape. Also, of course other cross sectional diameters may be used, e.g. between 0.5 mm and 6 mm, aptly 0.8 mm to 1.2 mm.

Figure 9:
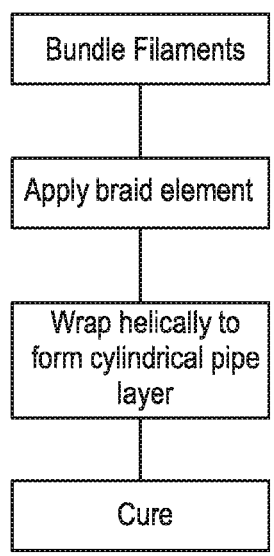
FIGS. 9 to 14 illustrate flow charts of methods of manufacturing a flexible pipe body.

With reference to FIG. 9, the plurality of filaments 302 are bundled together lengthways as a filament bundle. That is, the filaments 302 are brought together to be generally contacting at least one other filament and temporarily held as a bundle.

The filaments 302 are non-bonded filaments, i.e. they are free to move with respect to each other (and not consolidated).

A braid element 304 is applied around the filament bundle to form a braided bundle 310 including the non-bonded filaments 302, as shown in FIG. 3. The braiding machine 306 is used to apply a braid of strands over the filament bundle. The braiding machine is known per se in the art and will not be described further for brevity. However, the specific weave or density of the braiding may be predetermined to suit the type and amount of filaments that are to be bundled.

The braiding acts to hold the composite filaments 302 in place as a bundle 310. The braid element may also protect and/or strengthen the composite filaments in certain embodiments. In this example the braid element (fibres) 304 are a polypropylene tape, though the braid element may be or include a polymer tape, polymer fibres, a polyethylene, a PVDF, a Dyneema®, a reinforced polymer tape, a fibre yarn, thermoplastic material, thermoset material, glass fibre composite tape, aramid fibre yarn, tapes or fibres with thermoplastic encapsulation, tapes or fibres with partial thermoset matrix impregnation, or a combination thereof.

The braided bundle 310 is helically wrapped around a radially inner flexible pipe layer to form an armour layer. In typical use the armour elements are wound at a lay angle of around 20 to 88 degrees to the axis of the pipe. It will be appreciated that a single braided bundle may be helically wrapped to form a layer, or a number of braided bundles may be provided and applied as adjacent windings to form a layer.

Figure 5:
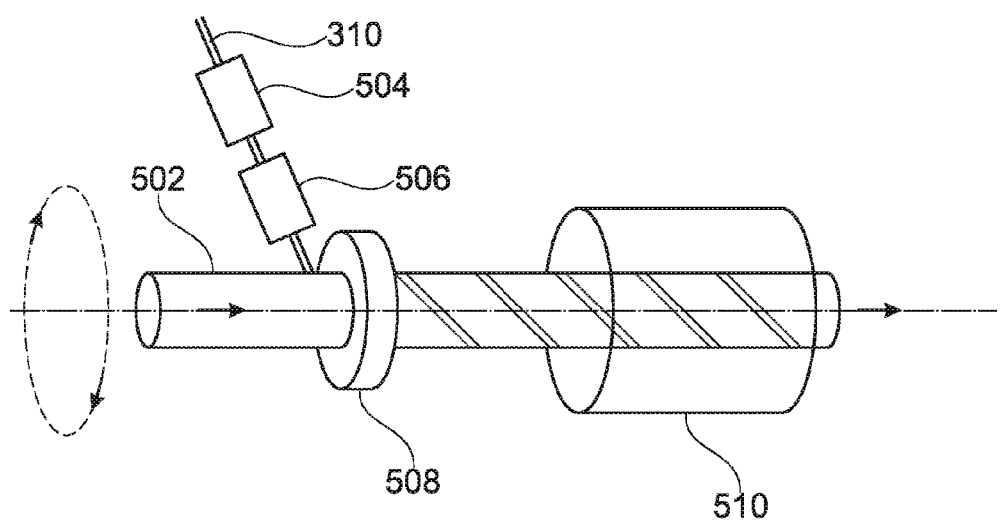
FIG. 5 illustrates apparatus for producing a flexible pipe.

FIG. 5 shows an apparatus for wrapping a braided bundle 310 over a radially inner layer 502 of flexible pipe body. The inner layer 502 is positioned using a guide 508 and moved laterally at a predetermined speed while the braided bundle is rotated around the flexible pipe body inner layer in order to helically wrap the bundle around the inner layer. The bundle 310 is fed towards the inner layer 502 at a predetermined angle and speed so as to be wrapped around the inner layer. Guiding elements 504, 506, 508 help to position the braided bundle more precisely in an accurate helical winding formation and may be aptly used to pre-form the braided bundle into a helical curve and direct the bundle shape prior to the wrapping onto the inner layer. That is, the bundle 310 is applied to the layer 502, being wrapped around the layer 502 by virtue of the rotation of the equipment including the guides 504, 506 and 508 and the bundle feed 310, and the linear translation of the layer 502.

Of course alternatively the inner layer 502 could be rotated while the bundle feed 310 and the guides 504, 506 and 508, remain in a fixed position. The wound braided bundle forms the shape of the tensile armour layer.

Although only one feed 310 is shown, further feeds can be used so as to allow further armour wires to be wound onto the pipe body. Further armour wires will increase the number (and relative density) of armour wires in the layer. A suitable number of elements (braided bundles) can be chosen such that the elements are configured so as to be able to move relative to one another but still to provide sufficient support to the inner layers of the pipe and to the flexible pipe as a whole.

It will be appreciated that a further layer of armour elements could be provided over the first layer of armour elements by either counter-winding elements in the opposite direction to the first layer, or winding in the same helical direction. For example, in order to balance torque induced when the pipe is pressurised or put under tensile load it may be desirable to wind the further layer in the opposite helical direction to the first layer. If however the further layer is configured to continuously interact and interlock with the first layer it is desirable to wind the further layer in the same orientation as the first layer.

It will also be appreciated that the further layer of armour elements could be provided over the first layer of armour elements in series with the first layer, in one continuous process, thereby making the manufacturing process more efficient for providing multiple layers on a flexible pipe.

Following helical wrapping of the braided bundle, the composite filaments 302 are then cured by heating the pipe body in an oven 510 to thereby change one or more physical and/or mechanical property of the composite filaments 302. Because of the lateral movement of the pipe body the pipe body is fed through the oven 510 and receives heat for a predetermined time.

Of course if the braid element includes a partial thermoset matrix impregnation, or other curable material, the heating step may be configured to also cure the braid element. Depending on the materials and heating times and intensities, the composite filaments may also be cured or consolidated with the braid element during the heating step. The filaments may also be consolidated with each other. The composite filaments may be cured or consolidated whilst the braid element is not cured or consolidated.

Consolidation may be enhanced or controlled through the application of at least one pressure roll which may apply a pressure to the outer surface of the braid element on the pipe immediately after the heating step. These pressure rolls may be configured to rotate around the pipe, generally following the path of the braid element, or following an axial path along the pipe. It will be understood that alternatives to the at least one pressure roll could be foreseen, such as skids performing a similar function to the at least one pressure roll, or an annular die of a pre-determined size through which the pipe passes to consolidate the material and control the outer diameter dimension of the pipe.

In the current embodiment the oven 510 is set to 220° C. to initiate curing of epoxy resin of the armour element 310, though it will be clear that other temperatures could be chosen, which will affect the curing time of the epoxy, and thus the speed at which the pipe body should travel through the oven.

In this embodiment epoxy resin is cured in the heating region by the oven. It will be apparent that the material could alternatively be cured in other ways, such as by application of other forms of radiation, or chemically cured. Curing may include treating the composite filaments 302 with heat or chemicals or a combination of both to change at least one physical and/or mechanical property, for example, the strength or Young's modulus. It will be appreciated that the braiding structure may also be subject to such heat and/or chemicals and consequently may also be cured.

As used herein, the term "cure" refers to a chemical change in a thermosetting material to permanently harden that material (as is known in the art).

As used herein, the term "consolidate" refers to the joining of materials or portions of material into a single mass.

In the method described above, the composite filaments are formed from a partially cured pre-preg material. Alternatively the filaments may be formed from an uncured material and the same method followed.

Figure 10:
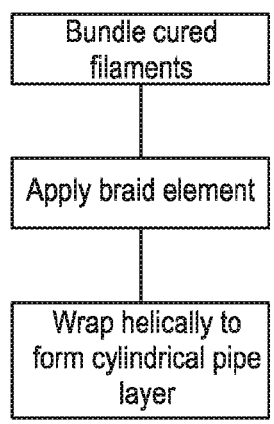

As a further alternative, the composite filaments may be initially provided in a cured form, and then the above method performed (but with the omission of the curing step (e.g. heating step) if not needed) (see FIG. 10).

It will be appreciated that the steps of providing the filament bundle, the separation layer, the braid element, and winding the braided bundle may be a continuous process, and the steps need not be discrete. That is, there may be an overlap in timing of these steps, particularly if the production process is continuous.

Figure 4B:
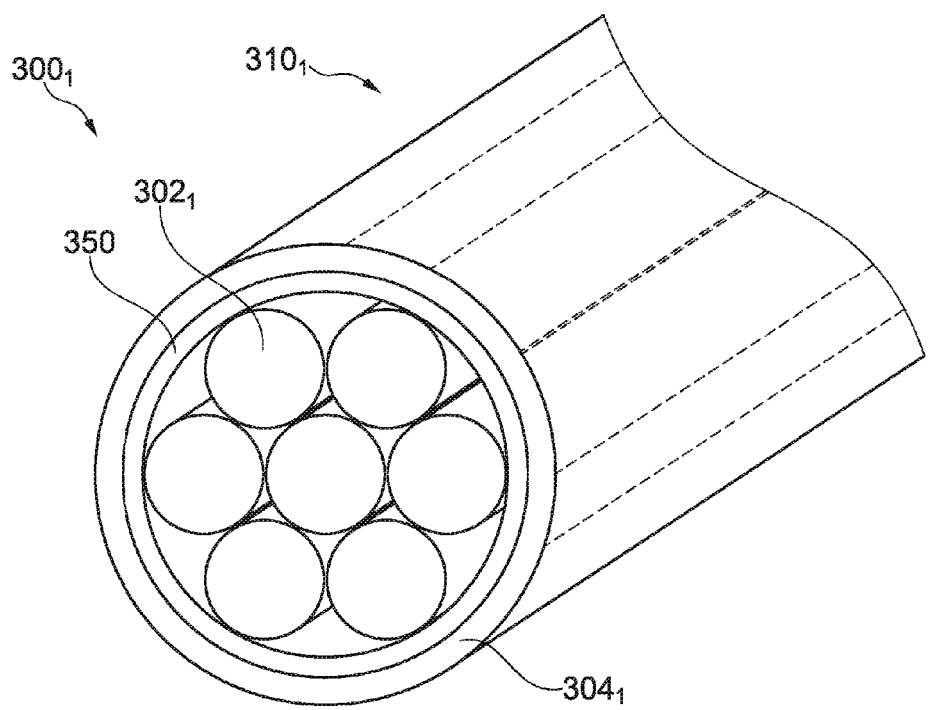
FIG. 4b illustrates another braided bundle for forming an armour layer.

As a variation to the methods described above, an additional layer may be added to the armour wire as a separation layer 350 between the filaments $302_1$ and braid element $304_1$, as shown in FIG. 4b. In this example the separation layer is formed from a layer of continuous polypropylene material although it is appreciated that other suitable materials may be used, for example polyurethane or PTFE. The filaments $302_1$ are formed of a pre-preg thermosetting material (as per filaments 302 described above). The braid element $304_1$ is a polypropylene tape with fibres with partial thermoset matrix impregnation.

Figure 11:
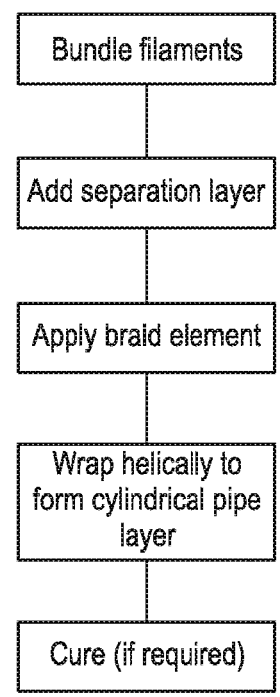

With reference to FIG. 11, the filaments $302_1$ are bundled together lengthways as a filament bundle.

Then, the separation layer 350 is added over the filament bundle to surround the filament bundle in a generally cylindrical formation. This separation layer 350 may be applied by extrusion or in the form of a tape helically wound around the filaments in the bundle.

The braid element $304_1$ is provided over the separation layer 350, i.e. radially outwards of the separation layer, to form a braided bundle $310_1$. The method of adding the braid element $304_1$ over the separation layer is be performed in the same manner as described above regarding braid element 304.

The remaining steps to form an armour wire $300_1$ for a flexible pipe may be as described above regarding armour wire 300. That is, briefly, the braided bundle is wrapped over a flexible pipe layer or mandrel, and then passed through an oven to cure the thermosetting material.

The provision of the separation layer 350 helps to ensure that the braid element $304_1$ and filaments $302_1$ continue to be able to act and move as separate elements, even after the braid element and/or filaments have undergone a curing stage (the heating step). That is, the separation layer helps to ensure that the braid element does not consolidate with or adhesively cure to the filaments during heating.

Figure 12:
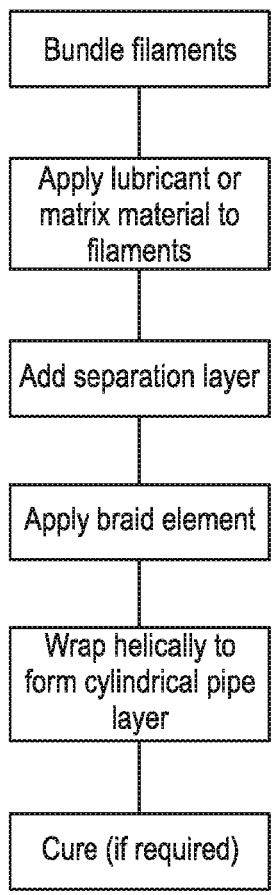

As an optional addition to the steps described in any of the examples above, a lubricant or uncured resin or other matrix material may be applied to the filament bundle prior to applying the braid element (see FIG. 12). For example, a lubricant, e.g. silicone oil or graphite may be applied to the surface of the composite filaments. This helps to ensure that each filament remains a discrete element and does not consolidate with other elements during a curing stage (e.g. heating step), for example.

Alternatively, it may be desired that the composite filaments are consolidated after curing. As such a matrix of uncured epoxy resin may be applied to generally fill the spaces between adjacent filaments. A separation layer provided over the filaments is optional. However, the separation layer may be useful if the matrix material is flowable (over the time prior to curing).

Aptly a separation layer may also be applied through the composite filaments in order to separate sections of the bundle from each other. The separation layer could therefore effectively split the bundle into, for example, two parts, or three parts, or more, creating sub-bundles which are then brought together as a bundle by the braid element.

Figure 4C:
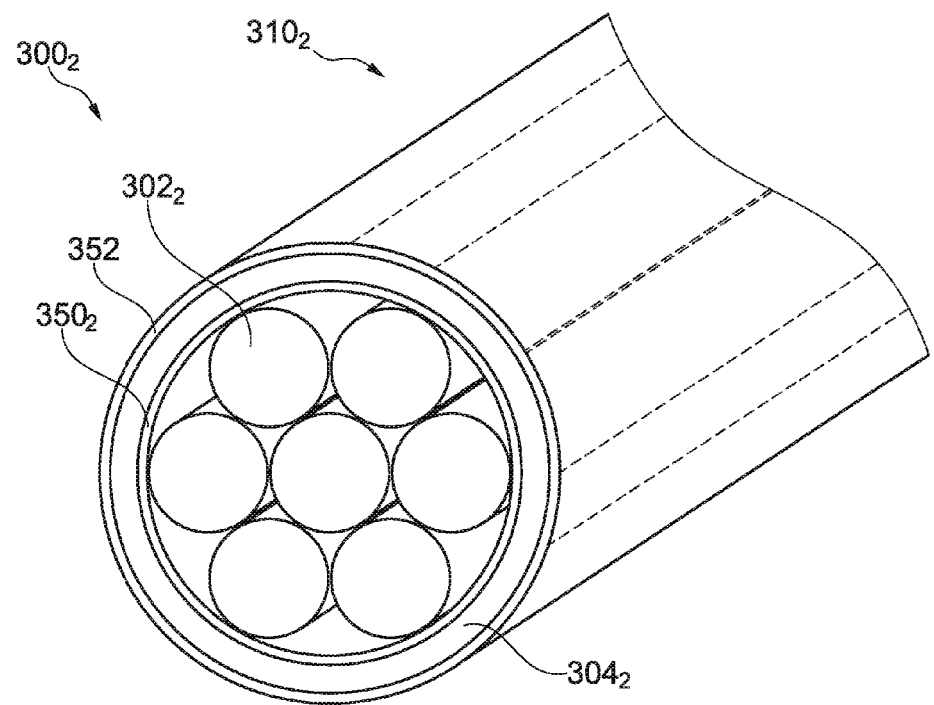
FIG. 4c illustrates another braided bundle for forming an armour layer.

FIG. 4c illustrates another exemplary embodiment. Various elements are similar to those described with respect to FIG. 4a and, for brevity, will not be discussed in detail.

An armour wire $300_2$ includes two or more composite filaments $302_2$, a separation layer $350_2$, a braid element $304_2$ and an outer layer 352. The separation layer $350_2$ is a layer of continuous material provided to surround the filament bundle and prevent any uncured matrix material from flowing between a core region including the filaments $302_2$ and the region of the braid element. In this example the separation layer is formed from polypropylene although it is appreciated that other suitable materials may be used, for example polyurethane or PTFE. In this case the outer layer 352 is the same form and material as the separation layer, though in other examples the outer layer may have different thickness and/or different material.

Figure 13:
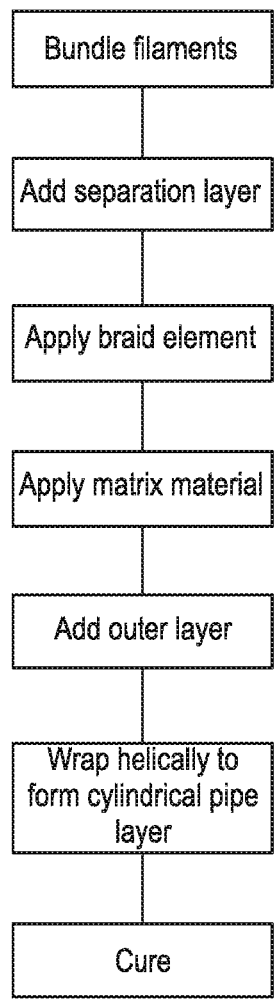

With reference to FIG. 13, the filaments $302_2$ are bundled together lengthways as a filament bundle.

Then, a separation layer $350_2$ is added over the filament bundle to surround the filament bundle in a generally cylindrical formation.

The braid element $304_2$ is provided over the separation layer $350_2$, i.e. radially outwards of the separation layer, to form a braided bundle $310_2$. This can be performed in the same manner as described above regarding braid element 304.

A matrix material (e.g. epoxy resin) is applied to the outer surface of the wrapped braided bundle. In this case the braided bundle is passed through a resin bath, i.e. a bath filled with epoxy resin in an uncured, liquid form. This matrix material covers the braid element $304_2$ and is retained between the gaps of the braid element, thereby forming a relatively smooth outer layer. The matrix material is prevented from passing the separation layer $350_2$ and does not reach the filaments $302_2$.

Figure 14:
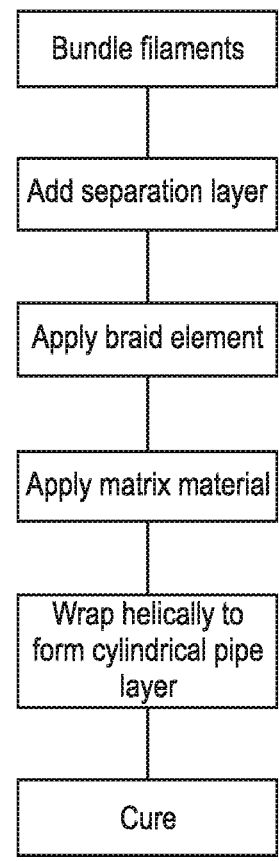

In this case a further layer (outer layer) 352, also of continuous polypropylene material is added around the braid element/epoxy resin layer, to help prevent the epoxy resin from flowing away prior to curing. It will be appreciated that this layer 352 may not be required depending on the viscosity of the matrix material and the timing before curing (see FIG. 14).

The resultant braided bundle is then helically wrapped around a flexible pipe layer as described above with respect to FIGS. 4a and 5.

The matrix material and partially cured filaments are cured by heating the layer in an oven (as described above with respect to FIG. 5). Of course the matrix material could be cured and/or consolidated in other ways such as application of other forms of radiation or chemical curing.

The resulting armour layer has a helically wound tensile armour element $300_2$ (the final braided bundle) and that element has a relatively smooth outer surface due to the epoxy resin applied to the braid element. The epoxy resin outer surface helps to strengthen the element and provide further protection to the armour layer. An armour layer as described above may be used as part of a flexible pipe body, in combination with one or more other layers such as those described above with reference to FIG. 1. For example, a flexible pipe body may include an inner layer, for example a fluid retaining layer (liner), and an armour layer, for example a tensile armour layer, the tensile armour layer provided over the inner layer. Any armour layer may be formed by the methods described above.

Various modifications to the detailed designs as described above are possible. For example, although an armour layer has been described above, the same techniques may be applied to form any other strength layer of a flexible pipe body.

Although the method described above describes wrapping a braided bundle over a radially inner layer of pipe body, the braided bundle may alternatively be wrapped over a mandrel, which can subsequently be removed.

It will be appreciated that in any of the examples described above, the steps of providing the filament bundle, the separation layer (if any), the braid element, the outer layer (if any), and winding the braided bundle may be a continuous process, and the steps need not be discrete. That is, there may be an overlap in timing of these steps, particularly if the production process is continuous.

It will be appreciated that in any of the examples described above, various steps may be performed in different orders to the order described. For example, for any example in which a filament bundle is wrapped around a pipe layer/mandrel and then cured, there is also the alternative that the filament bundle is cured first and then wrapped around a pipe layer/mandrel. As a further example, for any example in which a matrix material is added to a braided bundle, wrapped around a pipe layer/mandrel and then cured, this could alternatively be carried out by wrapping the braided bundle around the pipe layer/mandrel, and then the matrix material added, and then the resultant layer cured.

Additionally if pressure rolls are used during consolidation of the bundle around the pipe, that process could also be used to shape the bundle element somewhat to a desired shape (for example trapezoidal), or to ensure a controlled and consistent gap between adjacent wraps of the bundle element. Such controls may help to ensure the flexibility of the manufactured pipe.

Although the entire pipe layer above was heated so as to cure the filaments (and/or matrix material and/or braid material), alternatively a selective curing or selective heat source may be used so as to cure only the filaments (and/or matrix material and/or braid material) (and not affect the other elements such as the braiding or other pipe layers). An example of an alternative heating means is the use of induction heating.

As an optional further step, a filament bundle may have one or both ends 'fused' in a known manner so as to prevent the individual filaments and the braid element from separating at the end region. For example, this may be done by consolidating or curing the filaments in the end region by adding a matrix material to be cured in that region.

Figures 6, 7:
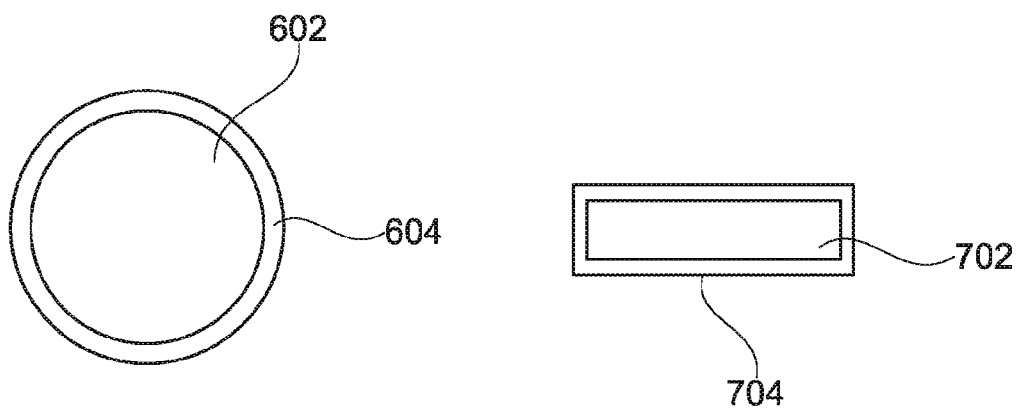
FIG. 6 illustrates a further braided bundle.
FIG. 7 illustrates a yet further braided bundle.

Although a plurality of filaments have been described above to form the filament bundle the bundle may consist of a single filament 602, 702, as shown in FIG. 6 or 7. The filament may be subject to braiding to form an outer braid 604, 704. The filament may have any cross section, for example round or rectangular as shown.

A further optional step is to include at least one filament, rod or wire of another material (for instance a metallic material) in order to provide additional benefits: a metallic wire could be used to maintain a formed shape in the bundle element through the plastic deformation of said metallic wire during the process of applying the bundle to the pipe; the metallic wire could also be used as a heating element, activated by induction currents during the heating/curing step, thereby heating the bundle element/filaments from within. Therefore although the plurality of filaments described above is all of one type of material, a combination of types of material may be combined to provide the braided bundle with a specific set of properties. One embodiment of this is to include one or more metallic wires or strands in the bundle as a stiffening element which could act as a support for the other filaments and the braid prior to consolidation and curing, could encourage retention of at least a degree of any pre-forming offered by guides 504, 506, and 508, and could act as heating elements within the structure when using induction for heat curing the braided bundle. Such a metallic wire would only provide limited strength and support in the flexible pipe body once the filaments are cured.

The material of the braiding itself may be adapted to provide wear resistance or low coefficient of friction between bundles and between layers in the flexible pipe. Such a material may be selected from coated yarns or fibres of materials of inherently low frictional properties, aptly the coefficient of friction for the materials or coated yarns or fibres is in the range 0.04-0.7, for example 0.05-0.4, for example 0.05-0.25. The type of weave and combinations of fibres woven together in combination may also be selected to provide the desired shape and performance from the outer braid.

The outer braid may also be of materials selected so that any pre-form shape imparted by the guides 504, 506 and 508 is maintained until such time as curing of the resin in the braided bundle is complete. Such pre-formed shapes may include rectangular, round, S or Z shape, T shape, C shape or X shape bundles. Combinations of such shapes may be used together in the same layer of the pipe providing mutual support and interaction.

The braiding material can also act as a barrier to the resin prior to and during curing and so ensure that the adjacent braided bundles in the flexible pipe body structure are not bonded together as a result of the curing process, providing a much more flexible structure to the finished flexible pipe.

Figure 8:
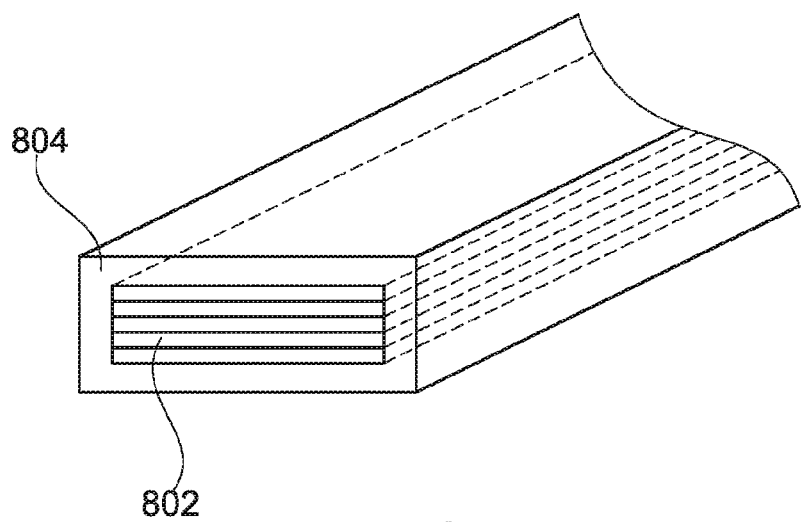
FIG. 8 illustrates a yet further braided bundle.

FIG. 8 shows another alternative in which flat rectangular filaments are bundled together along their broader sides, and then a braiding element 804 applied to form a braided bundle.

The flat rectangular filaments shown in FIGS. 7 and 8 may have a rectangular cross section with a thickness of 1 mm (i.e. the smaller of the two dimensions of the rectangle). Of course other cross sectional thicknesses may be used, e.g. between 0.75 mm and 1.5 mm, aptly 0.8 mm to 1.2 mm.

With the above-described arrangements a pipe body produced by the method may have increased flexibility compared to other known arrangements. Providing non-bonded filaments enables the filaments to be wrapped to form a cylindrical layer, and find their natural or preferred position with respect to each other and the object that they overlie. Such a layer will have increased flexibility compared to a solid pultruded portion of equal material amount. The filaments are free to move during the assembly of the pipe body layer, thereby reducing tension on the material during manufacture. Any bending strain on the filaments of composite forming the armour layer is minimised, which should provide increased strength and service lifetime to the final product compared to known arrangements. To some extent the formed armour layer may have increased flexibility during use of the formed pipe body, which is useful when a flexible pipe is used as a riser, for example, which can deal with motion from the sea.

Providing a braid element over the composite filaments is useful in helping to protect the filaments from damage under bending deformation.

Such 'in-situ' curing of the composite of the armour layer enables an armour layer to be formed substantially or completely free of residual strain within the material, because the material is not significantly bent or reformed subsequent to curing. The bending radius and twist occurs when the material is in its pre-cured state (which does not affect the material) and no bending or torsional stress is applied to the material post-curing except those anticipated during service of the pipe. This gives a higher quality product compared to known armour layers, since the armour element contains more useable strength then known armour elements that contain some residual strain. The product is more efficient than known armour layers in terms of strength per amount of material, and thus a longer pipe for deeper application is possible.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of manufacturing a flexible pipe body comprising:
   providing two or more non-bonded composite filaments as a non-bonded filament bundle;
   applying a lubricant to the non-bonded composite filaments;
   applying a braid element around the filament bundle to thereby form a braided bundle comprising non-bonded filaments; and
   helically wrapping the braided bundle around a flexible pipe body layer;
   wherein the method further comprises a step of curing the braided bundle to cause curing of each non-bonded filament, such that each filament remains a discrete element and does not consolidate into a single mass.

2. A method as claimed in claim 1 wherein the step of curing comprises curing the braided bundle after the step of helically wrapping the braided bundle around a flexible pipe body layer.

3. A method as claimed in claim 1 wherein the non-bonded filaments comprise partly cured polymer, uncured polymer, cured polymer, metal, epoxy resin, an elastomer, or a combination thereof.

4. A method as claimed in claim 1 further comprising a step of applying a matrix material to the braided bundle.

5. A method as claimed in claim 4, wherein the step of applying a matrix material to the braided bundle is performed prior to the step of helically wrapping the braided bundle around a flexible pipe body layer; and further comprising a step of applying an additional layer to the braided bundle prior to the step of helically wrapping the braided bundle around a flexible pipe body layer.

6. A method as claimed in claim 1 further comprising:
applying a separation layer around at least part of the filament bundle prior to the step of applying a braid element around the filament bundle.

7. A method as claimed in claim 1 further comprising a step of imparting a cross sectional shape to the braided bundle using the braid element.

8. A method as claimed in claim 1, further comprising a step of heating the braided bundle, and further comprising a step of imparting a cross sectional shape to the braided bundle using contact pressure after the heating step.

9. A method as claimed in claim 8 wherein said contact pressure is applied using at least one roll or skid in either a helical path around the flexible pipe body or axially along the flexible pipe body.

10. A method as claimed in claim 8 wherein said contact pressure is applied using an annular die or collar through which the flexible pipe body travels in the axial direction.

11. A flexible pipe body for transporting fluids from a sub-sea location, comprising:
an inner layer; and
an armour layer provided over the inner layer,
wherein said armour layer is obtainable by the process of:
providing two or more non-bonded composite filaments as a non-bonded filament bundle;
applying a lubricant to the non-bonded composite filaments;
applying a braid element around the filament bundle to thereby form a braided bundle comprising non-bonded filaments; and
helically wrapping the braided bundle around the inner layer;
wherein the process further comprises a step of curing the braided bundle to cause curing of each non-bonded filament, such that each filament remains a discrete element and does not consolidate into a single mass.

12. A flexible pipe body as claimed in claim 11 wherein the two or more composite filaments comprise a unidirectional composite fibre.

13. A flexible pipe body as claimed in claim 11 wherein the two or more composite filaments comprise a thermosetting or thermoplastic material.

14. A flexible pipe body as claimed in claim 13 wherein the two or more composite filaments comprise reinforcing fibres.

15. A flexible pipe body as claimed in claim 14 wherein the reinforcing fibres are glass fibres, carbon fibres, a polypropylene, a polyethylene, a polyester, a polyamide, a fluoropolymer, a PVDF, a dyneema®, a polymer tape, polymer fibres, a reinforced polymer tape, a fibre yarn, thermoplastic material, thermoset material, glass fibre composite tape, aramid fibre yarn, metallic wires, tapes or fibres with thermoplastic encapsulation, tapes or fibres with partial thermoset matrix impregnation, or a combination thereof.

16. A flexible pipe body as claimed in claim 11 wherein the braid element comprises a polymer tape, polymer fibres, glass fibres, carbon fibres, a polypropylene, a polyethylene, a polyester, a polyamide, a fluoropolymer, a PVDF, a dyneema®, a reinforced polymer tape, a fibre yarn, thermoplastic material, thermoset material, glass fibre composite tape, aramid fibre yarn, metallic wires, tapes or fibres with thermoplastic encapsulation, tapes or fibres with partial thermoset matrix impregnation, any of the above fibres or tapes combined with or coated with PTFE, or a combination thereof.

17. A flexible pipe body as claimed in claim 11 wherein at least one or more composite filament has a substantially rectangular cross-section or a substantially circular cross-section, or a substantially Z shaped cross section, or a substantially T shaped cross section, or a substantially C shaped cross section, or an X cross section.

18. A flexible pipe body as claimed in claim 11 wherein the braided bundle is pre-formed to a helix by guides.

19. A flexible pipe body as claimed in claim 18 wherein the pre-formed retains its pre-formed helix prior to curing of the bundle matrix as a result of comprising stiffening elements.

20. A flexible pipe body as claimed in claim 18 wherein a combination of shapes are used in the same layer of pipe body.

21. A flexible pipe body as claimed in claim 11 wherein bonding between braided elements during the curing process for the composite filaments is prevented by the braiding element.

22. A flexible pipe body as claimed in claim 11 wherein the curing process for the composite filaments is achieved or assisted by the direct heating of elements within the filament bundle by induction.

23. A flexible pipe body as claimed in claim 11 wherein the curing process for the composite filaments is achieved or assisted by the use of infra-red or microwave or direct radiant, conducted or convected heating.

24. A flexible pipe body as claimed in claim 11 wherein the one or more composite filament comprises a lubricant of oil, wax or uncured resin.

25. A flexible pipe body as claimed in claim 11 wherein the armour layer is obtainable by the process of providing a further filament bundle, applying a braid element around the filament bundle as a further braided bundle, prior to the steps of helically wrapping the braided bundle and further braided bundle and curing the composite filaments.

26. A flexible pipe comprising a flexible pipe body as claimed in claim 11 and one or more end fittings connected thereto.

* * * * *